US008527143B2

United States Patent
Tan

(10) Patent No.: US 8,527,143 B2
(45) Date of Patent: Sep. 3, 2013

(54) VEHICLE USER INTERFACE SYSTEM AND METHOD HAVING LOCATION SPECIFIC FEATURE AVAILABILITY

(75) Inventor: Adrian Tan, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 403 days.

(21) Appl. No.: 12/916,135

(22) Filed: Oct. 29, 2010

(65) Prior Publication Data
US 2012/0109451 A1     May 3, 2012

(51) Int. Cl.
*G06F 7/00*     (2006.01)

(52) U.S. Cl.
USPC ............. 701/36; 701/408; 701/423; 701/468; 701/2; 340/905; 340/988; 340/686.6; 340/995.19

(58) Field of Classification Search
USPC .......................................................... 701/36
See application file for complete search history.

(56) References Cited

U.S. PATENT DOCUMENTS

| 6,516,273 | B1 | 2/2003 | Pierowicz et al. | |
|---|---|---|---|---|
| 6,720,889 | B2 | 4/2004 | Yamaki et al. | |
| 6,892,116 | B2 | 5/2005 | Geisler et al. | |
| 7,684,910 | B2 | 3/2010 | Inbarajan | |
| 2002/0082771 | A1* | 6/2002 | Anderson | 701/209 |
| 2005/0125148 | A1* | 6/2005 | Van Buer et al. | 701/209 |
| 2006/0036356 | A1* | 2/2006 | Rasin et al. | 701/1 |
| 2008/0243373 | A1* | 10/2008 | Cat et al. | 701/207 |
| 2009/0146846 | A1* | 6/2009 | Grossman | 340/988 |
| 2009/0224942 | A1* | 9/2009 | Goudy et al. | 340/905 |
| 2012/0109451 | A1* | 5/2012 | Tan | 701/36 |

* cited by examiner

*Primary Examiner* — Redhwan K Mawari

(74) *Attorney, Agent, or Firm* — Global IP Counselors, LLP

(57) ABSTRACT

A vehicle user interface system comprises a vehicle location determining component, a jurisdiction determining component, a user input component, and a controller. The vehicle location determining component is configured to determine a current location of the vehicle. The jurisdiction determining component is configured to determine a current jurisdiction based on the current location of the vehicle, and to select a policy setting based on the current jurisdiction. The user input component is configured to receive information used by the vehicle user interface system to perform system operations. The controller is configured to control availability of the system operations for performance by the vehicle user interface system based on the selected policy setting.

18 Claims, 12 Drawing Sheets

VEHICLE USER INTERFACE SYSTEM AND METHOD HAVING LOCATION SPECIFIC FEATURE AVAILABILITY

BACKGROUND

1. Field of the Invention

The present invention generally relates to a vehicle user interface system and method having location specific feature availability. More specifically, the present invention relates to a vehicle user interface system and method that permits availability of user interface features based on criteria associated with the jurisdiction in which the vehicle is present.

2. Background Information

As navigation and communication systems in vehicles increase in capabilities and complexity, the concern about driver distraction also increases. Also, states and municipalities have widely varying laws governing the manner in which these systems are permitted to operate in the respective jurisdictions. For example, certain jurisdictions can regulate the manner in which information is presented to the driver, the types of warnings that are presented to the driver, and the manner in which such warnings can be presented.

To account for the different operations permitted in different jurisdictions, original equipment manufacturers (OEMs) will often program their systems to comply with the strictest jurisdiction for every operation. However, a user can become frustrated when a system refrains from performing a particular operation that is not restricted in the user's current jurisdiction simply because that operation is restricted in a stricter jurisdiction.

Another possible solution is to program the system to follow the jurisdiction of the user's residence. However, since jurisdictions can be contradictory in their governance of such systems, this may allow the user to inadvertently violate the law of a different jurisdiction when the vehicle enters that different jurisdiction, which can be even only a few miles of the user's residence. Therefore, programming a system to follow a single set of rules can become problematic.

SUMMARY

It has been discovered that a need exists for a vehicle user interface system, such as a navigation or communication system, that is capable of controlling availability of system operations based on the jurisdiction in which the vehicle is present.

In view of the state of the known technology, one aspect of the present invention provides a vehicle user interface system comprising a vehicle location determining component, a jurisdiction determining component, a user input component, and a controller. The vehicle location determining component is configured to determine a current location of the vehicle. The jurisdiction determining component is configured to determine a current jurisdiction based on the current location of the vehicle, and to select a policy setting based on the current jurisdiction. The user input component is configured to receive information used by the vehicle user interface system to perform system operations. The controller is configured to control availability of the system operations for performance by the vehicle user interface system based on the selected policy setting.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
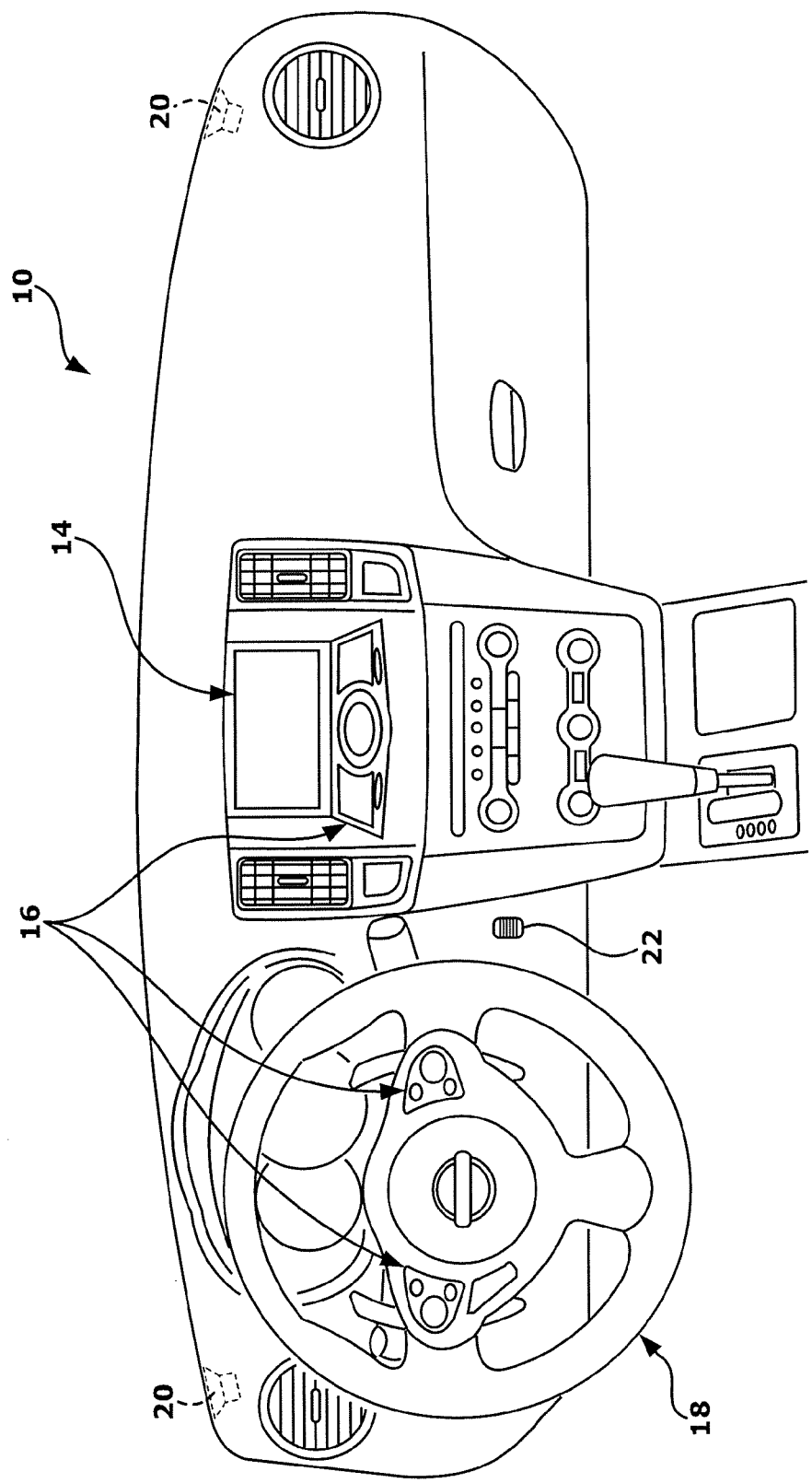
FIG. 1 is a perspective view illustrating an example of the instrument panel in the passenger compartment of a vehicle employing embodiments of a vehicle user interface system described herein.
Figure 2:
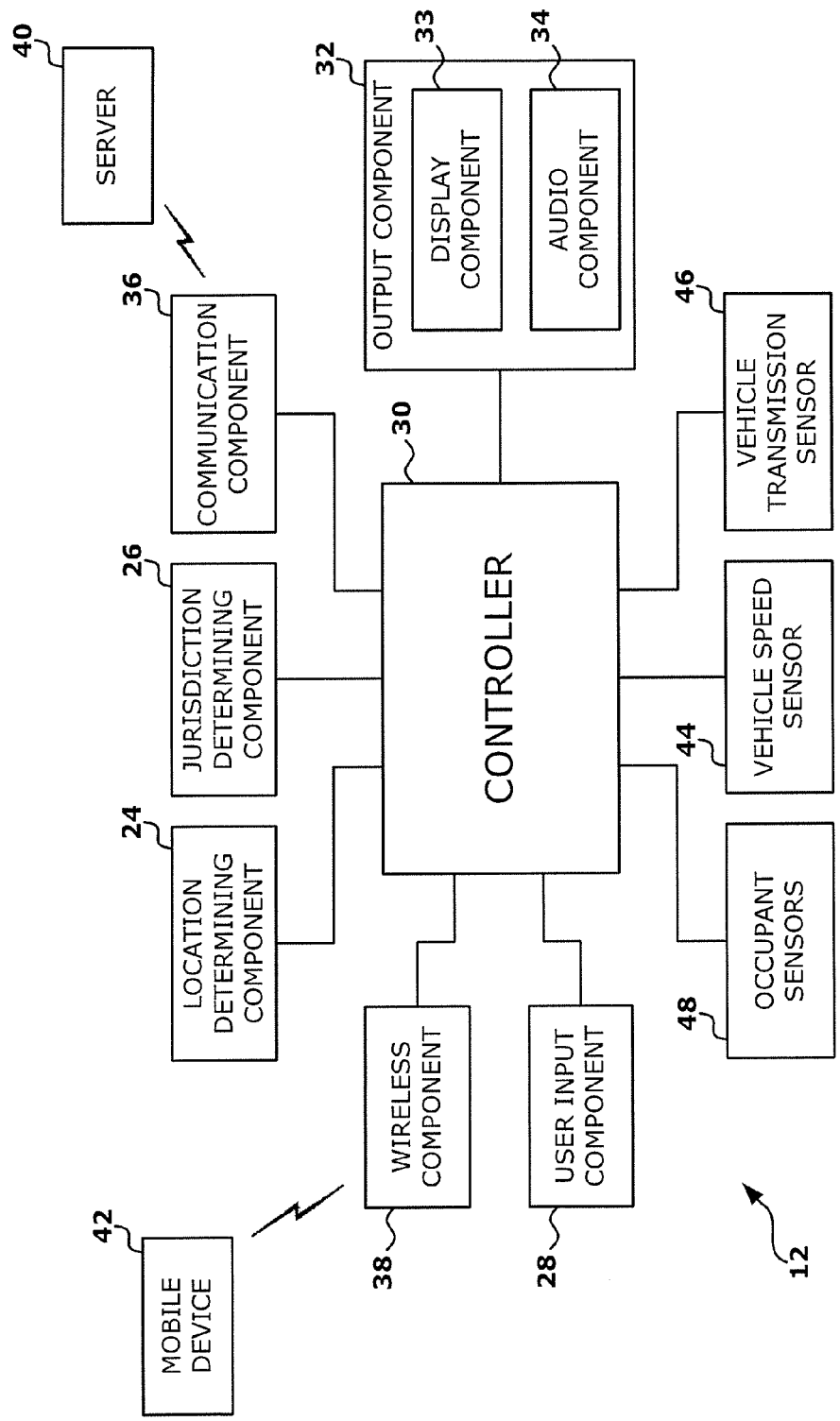
FIG. 2 is an exemplary schematic view of an embodiment of a vehicle user interface system employed in the vehicle as shown in FIG. 1.

FIG. 1 illustrates an example of an instrument panel 10 in the passenger compartment of a vehicle, and FIG. 2 illustrates an exemplary block diagram of an embodiment of a vehicle user interface system 12 employed in the vehicle. An instrument panel 10 typically includes at least one display screen 14 that can display information including navigation information such as maps, route information and the like, provided by a navigation component as known in the art. The display screen or screens 14 can also display vehicle condition information and messages, entertainment system information (e.g., radio channels), and communication information such as telephone calling information and so on. A plurality of control buttons 16 can be disposed, for example, on the steering wheel 18 and at other locations on the instrument panel 10. For example, control buttons 16 can be present below the display screen, and the display screen 14 can display control buttons that can be operated by a user as understood in the art. Speakers 20 can be disposed in the instrument panel 10 and at various locations within the passenger compartment of the vehicle. Also, a microphone 22 can be disposed in the instrument panel 10 or at any other suitable location within the passenger compartment of the vehicle, to receive voice input from a user. Accordingly, the speakers 20 emit sound, such as music from the entertainment system of the vehicle, voice from hands-free telephone use, or messages pertaining to vehicle conditions, navigation and so on, to name a few. The microphone 22 receives, for example, voice commands for the vehicle user interface system 12 and voice input for hands-free telephone use.

As shown in FIG. 2, the vehicle user interface system 12 includes a vehicle location determining component 24, a jurisdiction determining component 26, a user input component 28, and a controller 30. The vehicle user interface system 12 also includes an output component 32 that includes, for example, display component 14 and an audio component 34. The vehicle user interface system 12 further includes a communication component 36 and a wireless component 38.

The vehicle location determining component 24 is configured to determine a current location of the vehicle. The vehicle location determining component 24 can include, for example, global positioning system (GPS) equipment that is capable of identifying the location of a vehicle. Also, the vehicle location determining component 24 can use cellular phone or personal digital assistant (PDA) GPS location information that is transmitted via the phone or PDA to the vehicle location determining component 24 by, for example, Bluetooth or any other suitable technology if GPS technology is not available in the vehicle components. The vehicle location determining component 24 is also configured to use, for example, dead-reckoning and map matching to determine vehicle location, as well as time-zone date to determine the regional location of the vehicle as understood in the art.

The jurisdiction determining component 26 is configured to determine a current jurisdiction based on the current location of the vehicle, and to select a policy setting based on the current jurisdiction. The policy setting is based on the laws, regulations, ordinances, etc. of that jurisdiction. For instance, laws governing distracted driving due to texting and telephone use vary from state to state. Other laws such as those governing radar detector use, navigation feature use, and so on also vary from state to state. Hence, different policy settings will be associated with different jurisdictions. It should also be noted that certain jurisdictions may have no restrictions, in which event the policy settings associated with those jurisdictions will have no restrictions. The jurisdiction determining component 26 can include, for example, a look-up table that associates policy settings with jurisdictions, or any other suitable memory configuration for associating the policy settings with the jurisdictions. Therefore, the jurisdiction determining component 26 can retrieve the appropriate policy setting for the jurisdiction that the vehicle is in as determined by the vehicle location determining component 24. Also, as understood by one skilled in the art, the vehicle location determining component 24 and jurisdiction determining component 26 need not be separate components, but can be included, for example, in the controller 30 or in other hardware and software.

As further discussed below, the user input component 28 is configured to receive information used by the vehicle user interface system to perform system operations. The user input component 28 can include, for example, the control buttons 16 and/or control buttons displayed on display 14 or on any other display, which enable a user to enter commands and information for use by the vehicle user interface system 12 and, in particular, the controller 30. The user input component 28 can also include the microphone 22 that enables a user to enter commands or other information vocally.

The controller 30 is configured to control availability of the system operations for performance by the vehicle user interface system 12 based on the selected policy setting. For example, the controller 30 is configured to prohibit performance of some of the operations of the vehicle user interface system 12 based on the selected policy setting. Also, the controller 30 is configured to receive signals from vehicle sensors indicating vehicle conditions, such as a vehicle speed sensor 44 indicating the speed of the vehicle, and a vehicle transmission sensor 46 indicating the state in which the vehicle is operating. The controller 30 is further configured to permit or prohibit performance of some of the operations of the vehicle user interface system 12 based on the selected policy setting and the vehicle condition, including the vehicle speed and vehicle transmission state (e.g., park, drive, etc.) as discussed in more detail below. Also, the controller 30 is configured to permit or prohibit performance of some of the operations of the vehicle user interface system 12 based on the selected policy setting and information received from occupant sensors 48 indicating whether the person attempting to perform the operations is a driver or passenger.

As understood by one skilled in the art, the controller 30 preferably includes a microcomputer with a control program that controls the vehicle user interface system 12 as discussed herein. The controller 30 can also include other conventional components such as an input interface circuit, an output interface circuit, and storage devices such as a ROM (Read Only Memory) device and a RAM (Random Access Memory) device. The RAM and ROM store processing results and control programs that are run by the controller 30. The controller 30 is operatively coupled to the components of the vehicle user interface system 12, and to the components of the vehicle 12 as appropriate, in a conventional manner. It will be apparent to those skilled in the art from this disclosure that the precise structure and algorithms for the controller 30 can be any combination of hardware and software that will carry out the functions of the embodiments discussed herein.

The output component 32 is configured to provide information pertaining to the operations of the vehicle user interface system 12. The output component 32 may include a display which can be, for example, display 14 as discussed above, or a separate display or displays. That is, the display 14 can include input features of the user input component 28 and output features of the output component 32. As mentioned above, the output component 32 may also include an audio component 34 that includes at least one speaker which can be, for example, one or more of speakers 20, or separate speakers. The output component 32 can also include other output devices such as tactile devices that can provide a tactile warning to the user via, for example, the seat or steering wheel. The communication component 36 is controlled by controller 30 to perform communication operations which are among the system operations discussed herein. That is, the communication component 36 is configured to enable the vehicle user interface system 12 to wirelessly communicate with, for example, a server 40 that is remote from the vehicle, the Internet, and other systems and networks that are remote from the vehicle. For example, the server 40 can communicate information pertaining to the jurisdictions and associated policy settings discussed herein to the communication component 36 periodically or upon request, so that the vehicle user interface system 12 (e.g., the jurisdiction determining component 26) can store and update such information.

The wireless component 38 is controlled by controller 30 and is configured to enable the vehicle user interface system 12 to communicate with a mobile device 42, such as a wireless telephone, personal digital assistant (PDA), 3G and 4G broadband devices, and any other suitable wireless communication device. Accordingly, the communication component 36 is further configured to perform a telephony operation which is among the system operations and includes at least one of placing, receiving, and conducting telephone calls via, for example, the mobile device 42 and wireless component 38 or via the features of the vehicle user interface system 12. The communication component 36 is also configured to perform a messaging operation which is among the system operations discussed herein and includes at least one of creating, sending, receiving, and viewing messages via the mobile device 42 and wireless component 38. The communication component 36 is further configured to perform an Internet function which is among the system operations discussed herein and includes enabling the viewing of Internet content on, for example, display 14 or a display on the mobile device 42. As discussed in more detail below, the controller 30 controls the output component 32 (e.g., the display 14 and/or the audio component 34) to provide the appropriate visual and audio output of the vehicle user interface system 12 to the user.

An example of operations performed by the vehicle user interface system 12 will now be described with reference to the flowchart shown in FIG. 3. The operation of the vehicle user interface system 12 can begin automatically when the vehicle's ignition is started. In particular, as will now be discussed, the controller 30 is configured to control the vehicle user interface system 12 to provide an alert based on the selected policy setting upon startup of the vehicle. Also, the user input component 28, for example, can include an activation switch that enables the user to turn the operation of the vehicle user interface system 12 on and off.

When the processing begins in step 100 (e.g., when the vehicle's ignition is started), the location determining component 24 determines a current location of the vehicle in step 110 through the use of, for example, GPS equipment or in any other suitable manner. The location determining component 24 can be controlled by the controller 30 to determine the current location of the vehicle, or can include control and processing features independent of the controller 30. Also, the controller 30 can control the output component 32 to display the current location of the vehicle on a navigation map which can be displayed on the display 14 or on any other suitable display. As in conventional navigation systems, the user can configure the display 14 to display the current location of the vehicle in any suitable manner.

In step 120, the jurisdiction determining component 26 determines a current jurisdiction based on the current location of the vehicle. The jurisdiction determining component 26 can be controlled by the controller 30 to determine the current jurisdiction, or can include control and processing features independent of the controller 30. As discussed above, the jurisdiction determining component 26 can include, for example, a look-up table that associates policy settings with jurisdictions, or any other suitable memory configuration for associating the policy settings with the jurisdictions. Alternatively, the jurisdiction determining component 26 can send a request via, for example, communication component 36 to the server 40, or any other off-vehicle location, which can transmit the appropriate jurisdiction and associated policy setting information for receipt by the communication component 36 and thus, by the jurisdiction determining component 26. In this event, the server 40 or other off-vehicle location provides the jurisdiction and associated policy setting information to the jurisdiction determining component 26 in real-time or essentially real-time on an as-requested basis. In step 130, the jurisdiction determining component 26 can select the appropriate policy setting for the jurisdiction that the vehicle is in as determined by the jurisdiction determining component 26 based on the current vehicle location as determined by the vehicle location determining component 24.

Furthermore, the policy settings information stored in the vehicle user interface system 12 can be updated using, for example, telematics or by any other suitable technique. For example, the communication component 36 is configured to receive updated policy settings and jurisdictional information from, for example, the server 40 or any other suitable source. The communication component 36 can request such updates periodically (e.g., daily, weekly, monthly, etc.) under the control of controller 30, for example, or can operate to monitor for receipt of updates from the server 40 or any other source. That is, the server 40 or other source can be configured to broadcast updated jurisdictional or policy settings when a change to the jurisdictional information or policy settings occurs. Thus, the communication component 36 can receive such updates when they are broadcast. The controller 30, for example, controls the jurisdiction determining component 26 to update the stored jurisdiction information and policy settings in accordance with the updates received by the communication component 36. The updating can also be performed via manual entry or by using storage media such as a CD ROM, flash drive, etc. Accordingly, the jurisdiction determining component 26 will store and have access to the most current jurisdictional information and policy settings. By providing a real-time or essentially real-time means of updating the vehicle user interface system 12 as discussed above, customer safety and satisfaction can be maximized throughout the life of the vehicle.

Figure 4:
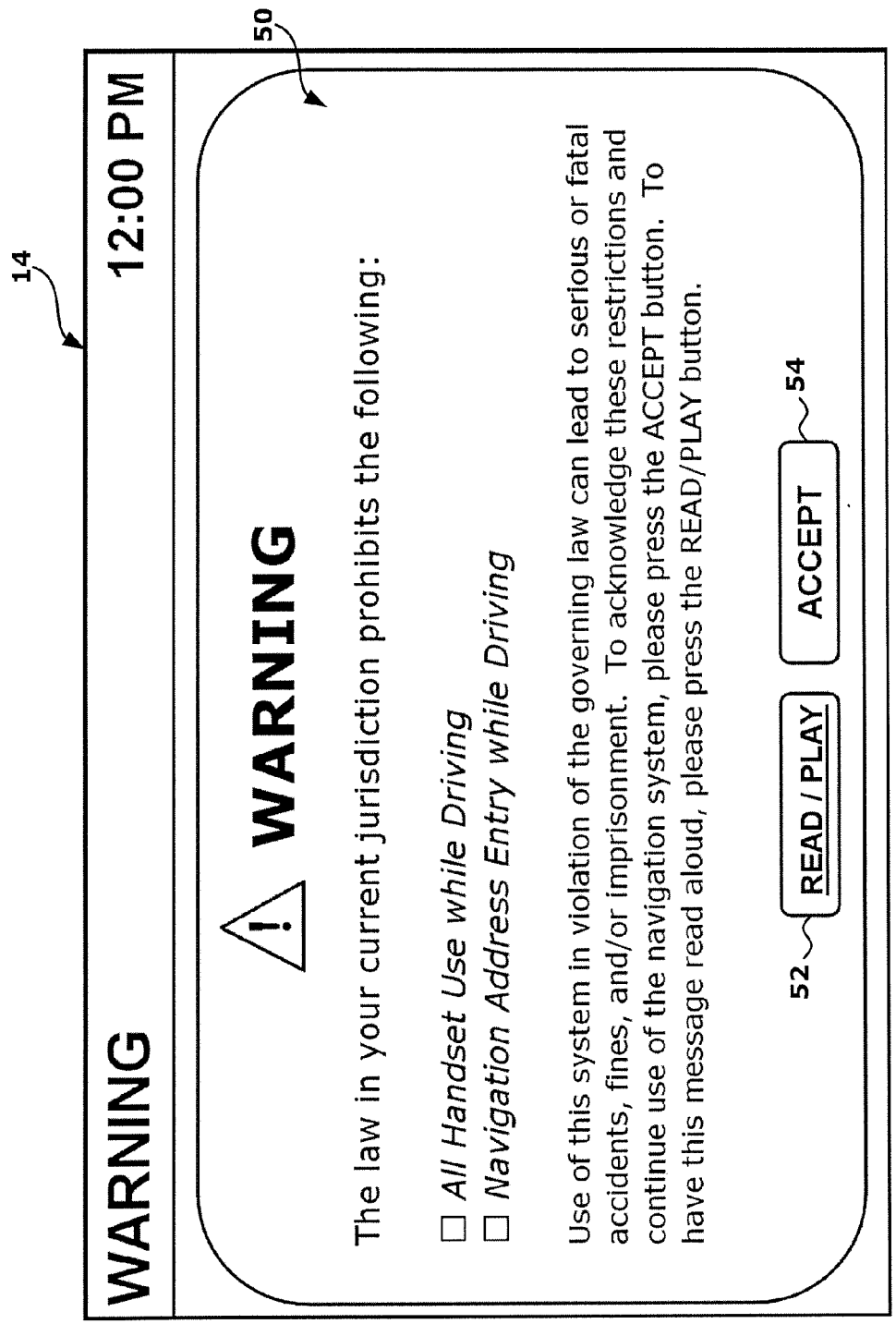
FIG. 4 is an example of a warning displayed by the vehicle user interface system.

In step 140, the controller 30 controls the vehicle user interface system 12 to present a warning about the selected settings. For example, the controller 30 can control the output component 32 to display a message 50 as shown in FIG. 4 on the display screen 14. In this example, the policy settings of the particular jurisdiction prohibit the use of a handset while driving, and prohibit navigation address entry while driving. In addition, or alternatively, the controller 30 can control the output component 32 to issue an audible warning about the prohibited operations through the audio component 34. For example, the controller 30 can automatically control the audio component 34 to audibly read the text of the message 50. Also, the message 50 can include a read/play button 52 that the user can select to instruct the controller 30 to control the audio component 34 to audibly read the text of the message 50. In addition, the message 50 can include an acknowledgement button 54 (an "ok" or "accept" button) that the user can select to acknowledge the warning. When the acknowledgement button 54 has been selected, the controller 30 can control the display 14 to stop displaying the message 50. Furthermore, if a particular jurisdiction has no restrictions, the policy settings associated with that jurisdiction will have no restrictions. In this event, the controller 30 can control the output component 32 to refrain from issuing any warning, or can control the output component 32 to issue a visual and/or audible message that no restrictions are in force in that particular jurisdiction.

Figure 5:
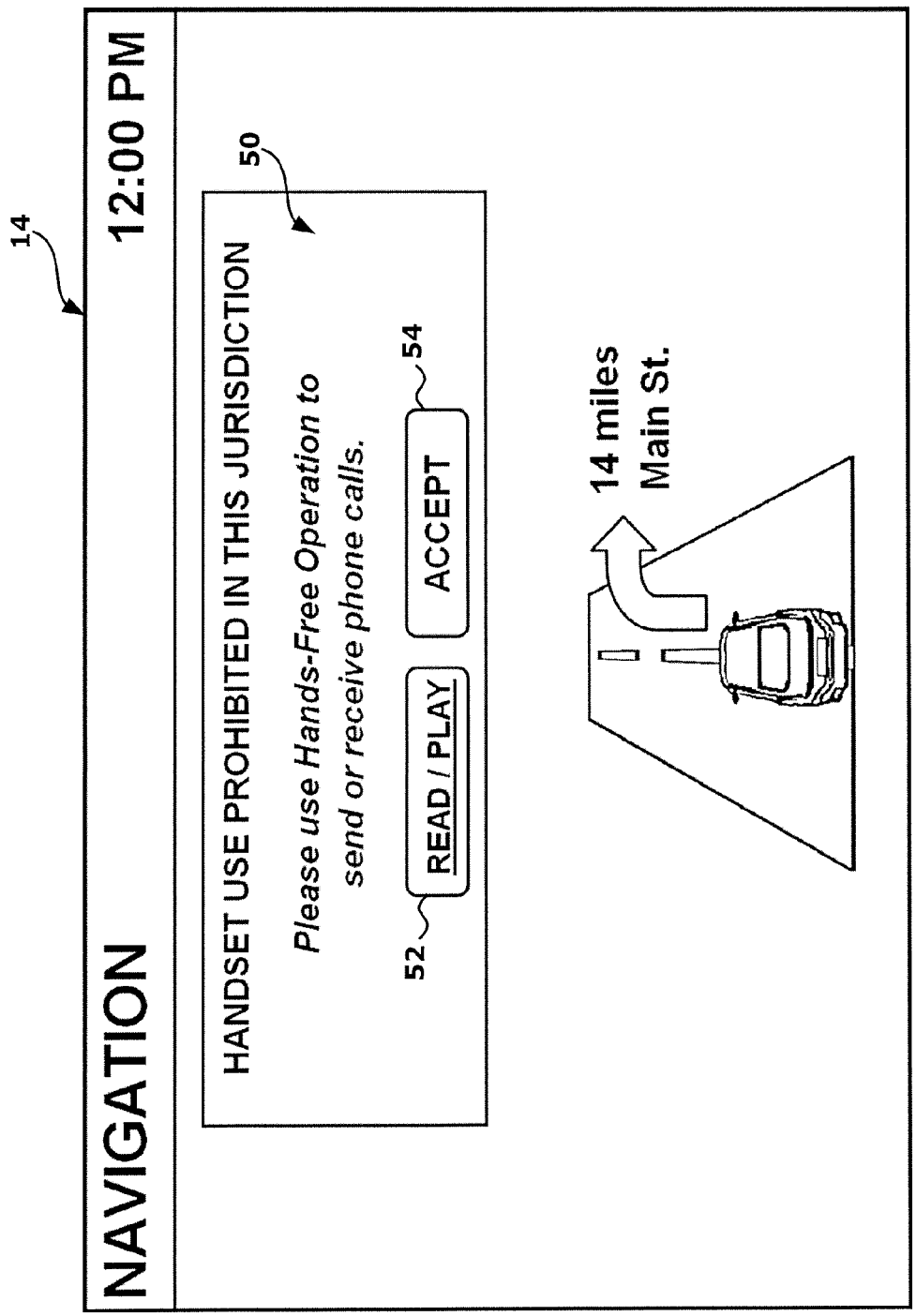
FIG. 5 is another example of a warning displayed by the vehicle user interface system.
Figure 6:
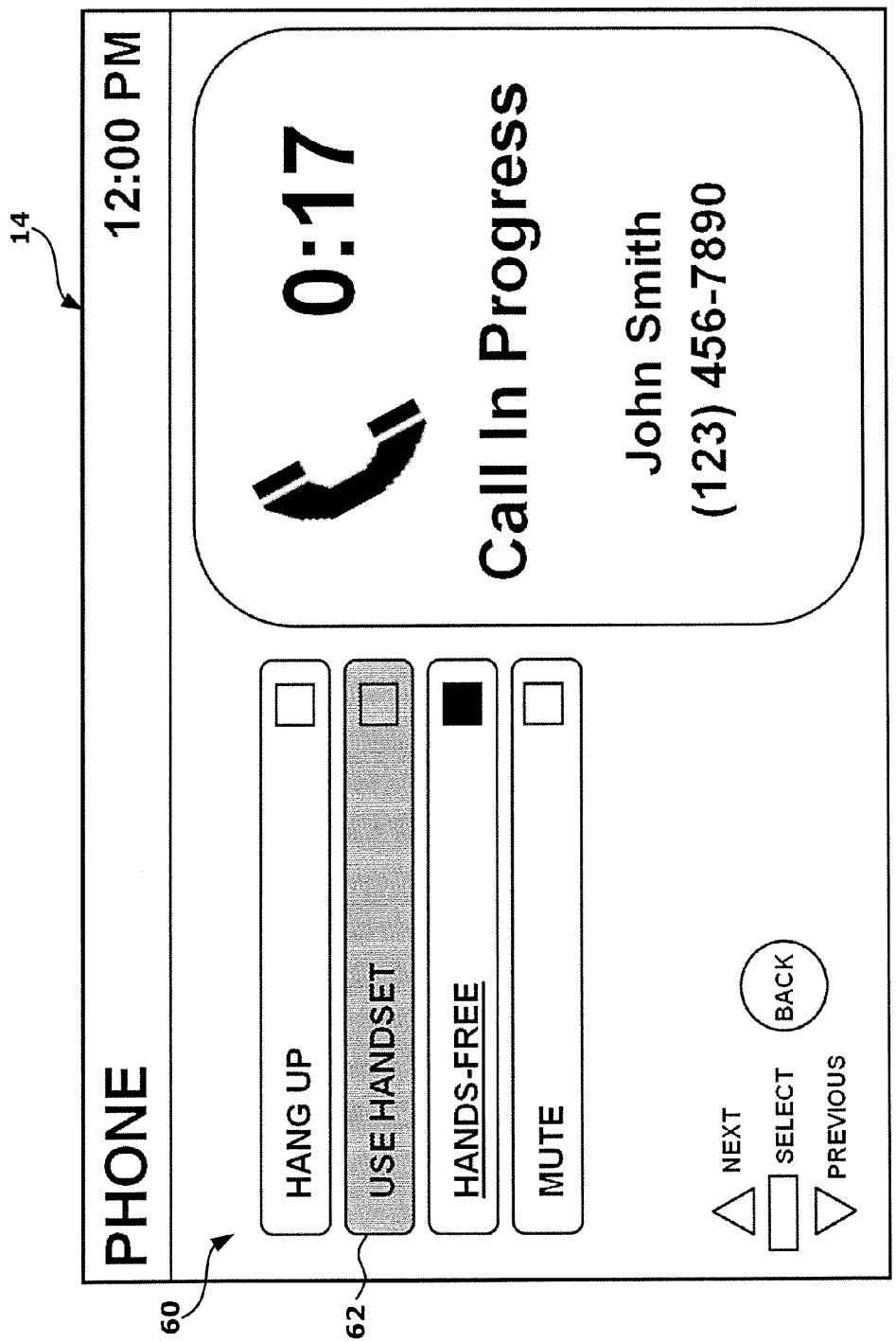
FIG. 6 is an example of a display screen having a function restricted or prohibited by the vehicle user interface system.

In step 150, the controller 30 controls the vehicle user interface system 12 in accordance with the policy settings that were selected by the jurisdiction determining component 26. In doing so, the controller 30 can control the vehicle user interface system 12 to present the required warnings, such as those shown in FIG. 4 or 5. Also, the controller 30 can lock out or otherwise prevent the vehicle user interface system 12 from performing the system operations prohibited by the policy settings that were selected. For example, as shown in FIG. 6, when a user attempts to use the telephony features, the controller 30 can disable or "gray out" the "use handset" button 62 which is among the telephony buttons of a telephony display 60 that can be displayed by the display 14. In another example shown in FIG. 7, when a user attempts to use navigation features, the controller can disable or "gray out" the "enter destination" button 72 and the "point of interest search" button 74 which are among the navigation buttons of a navigation display 70 that can be displayed by the display 14. The navigation display 70 can further include, for example, an access jurisdiction information button 76 which enables a user to select a jurisdiction and be visually and/or audibly presented with the policy settings associated with that jurisdiction. The jurisdictions could be displayed in a menu type fashion as in a typical destination entry or point of interest search, or in any other suitable manner as understood in the art. Naturally, this feature may be among those restricted in certain jurisdictions along with the destination and point of interest search features.

In addition, according to the selected policy settings, the controller 30, can prohibit or restrict the manner in which the user interacts with the vehicle user interface system 12 and vice-versa. For example, the controller 30 can control the vehicle user interface system 12 to permit only audible instructions to be received and/or only audible output to be provided, and to prohibit any text or visual information to be output or input. Alternatively, or in addition, the controller 30 can control the vehicle user interface system 12 to permit only text or visual information to be input or output to and from the vehicle user interface system 12, while prohibiting any audible input and/or output. Naturally, the controller 30 can control the input and/or output of the vehicle user interface system 12 to be a combination of audio and visual information. Furthermore, in the case where there) are no restrictions associated with a particular jurisdiction, the controller 30 can control the vehicle user interface system 12 to permit all of the available operations and functions to be performed.

Furthermore, in step 150, the controller 30 may restrict certain functions, instead of completely prohibiting them or locking them out. For example, the selected policy setting may permit texting or handset use when the vehicle is stopped or the vehicle transmission is in park. Accordingly, the controller 30 can determine from the vehicle speed sensor 44 and vehicle transmission sensor 46 (FIG. 2) whether the vehicle speed is zero and/or whether the vehicle transmission is in park. If the vehicle speed is zero or the vehicle is in park, the controller 30 can permit texting or handset use, and can control the output component 32 to present a message to the user that texting and/or handset use is permitted when the vehicle is stopped or in park. However, when the controller 30 determines from the vehicle speed sensor 44 and/or vehicle transmission sensor 46 that the vehicle is moving and/or the vehicle transmission is no longer in park, the controller 30 can restrict the texting and handset use operation, and control the output component 32 and/or audio component 34 to present a suitable warning message. Hence, the controller 30 is further configured to control availability of some of the system operations for performance by the vehicle user interface system 12 based on the selected policy setting and a detected vehicle speed of the vehicle.

The controller 30 is further configured to determine whether a user is a driver or a passenger using, for example, sensors 48 in the seats of the vehicle, or cameras or other visual or tactile sensors in the vehicle to determine whether the driver or a passenger is using a particular feature. The controller 30 is thus configured to control availability of some of the system operations for performance by the vehicle user interface system 12 based on the selected policy setting and whether the user is a driver or a passenger. Other operations, such as navigation operations which are performed by the navigation component, are among the system operations that can be locked out or restricted. For example, an address entry function and a point of interest search function are among the navigation operations which can be locked out or restricted. Also, the controller 30 can limit the number of characters that could be entered in a navigation system or the functions that are available to accept the character entry. These character and function limitations can be limited by, for example, the speed of the vehicle, etc.

Figure 8:
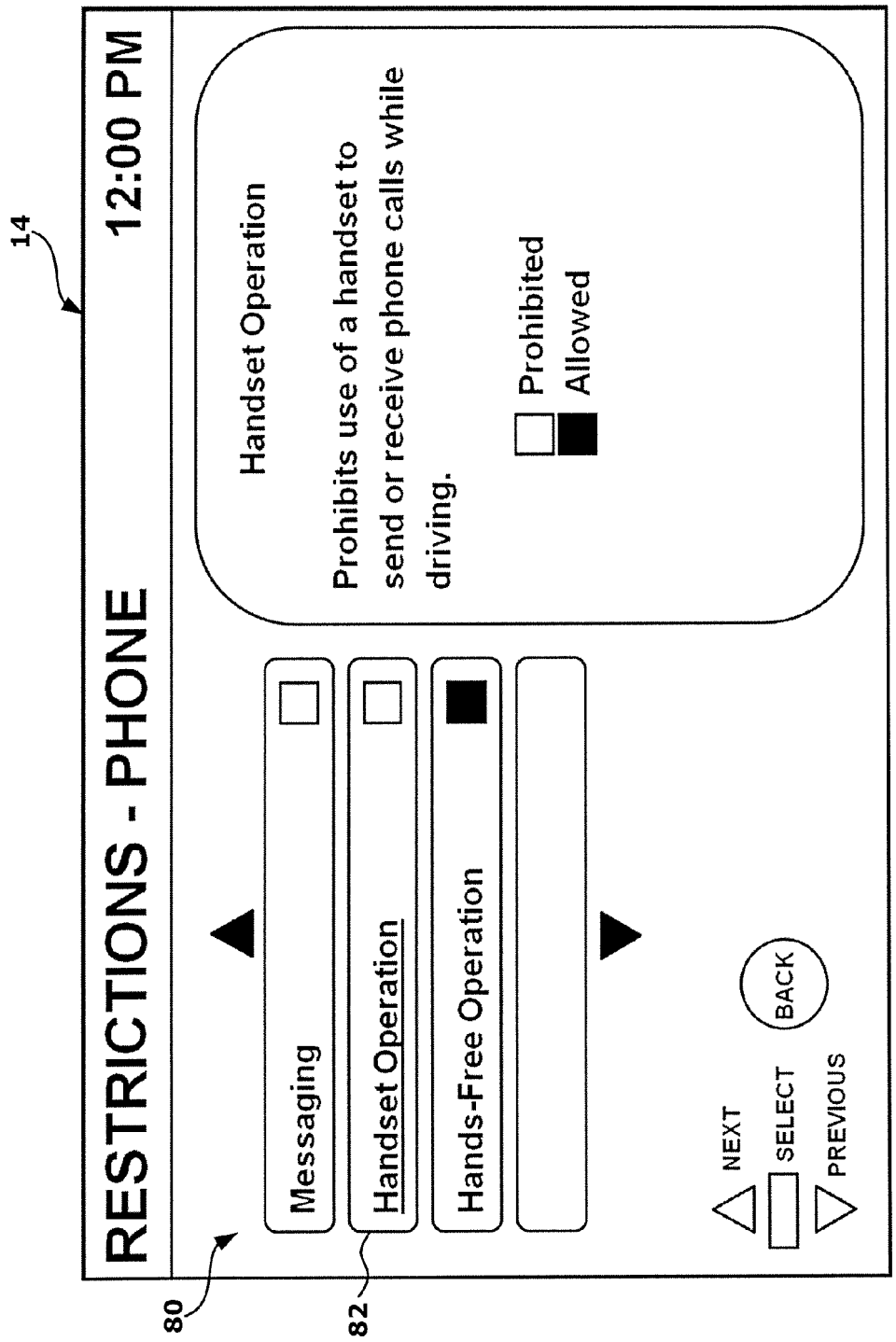
FIG. 8 is an example of a telephone features display screen that can be displayed on the display of the vehicle user interface system.

The vehicle location determining component 24 continues to monitor the location of the vehicle. Furthermore, the processing beginning in step 160 can be performed to determine whether additional policy settings have been selected by a user. For example, the user can implement parental lock-out of certain functions (e.g., cell phone use, texting, etc.) for a beginner driver through the use of the user input component 28. This can be accomplished by using the control buttons 16 to control the display 14, for example, to display a telephone features setting display 80 as shown in FIG. 8. The user can use the control buttons 16 to select, for example, the handset operation control button 82 to display handset operation controls 84 for allowing or prohibiting handset operation during driving. Other policy settings for telephony, communication and navigation operations can be set by a user in a similar manner.

Also, the vehicle user interface system 12 can be controlled to affect mandatory or court-ordered lock-out features, such as those required for repeat offenders, etc. Commands for such mandatory or court-ordered lock out features can be entered by a third party (e.g., police officer) via the user input component 28 using, for example, a passcode which prevents the driver or others from disabling the lock out features. Also, commands for such lock out features can be implemented by telematics. That is, the commands can be received via the communication component 36 from a remote location (e.g., server 40), and upon receiving these commands, the controller 30 will implement the appropriate lockout. The lockout features that are entered manually or by telematics can expire automatically after a required period of time (e.g., a 30 day suspension) or can be disabled manually or by telematics.

Figure 3:
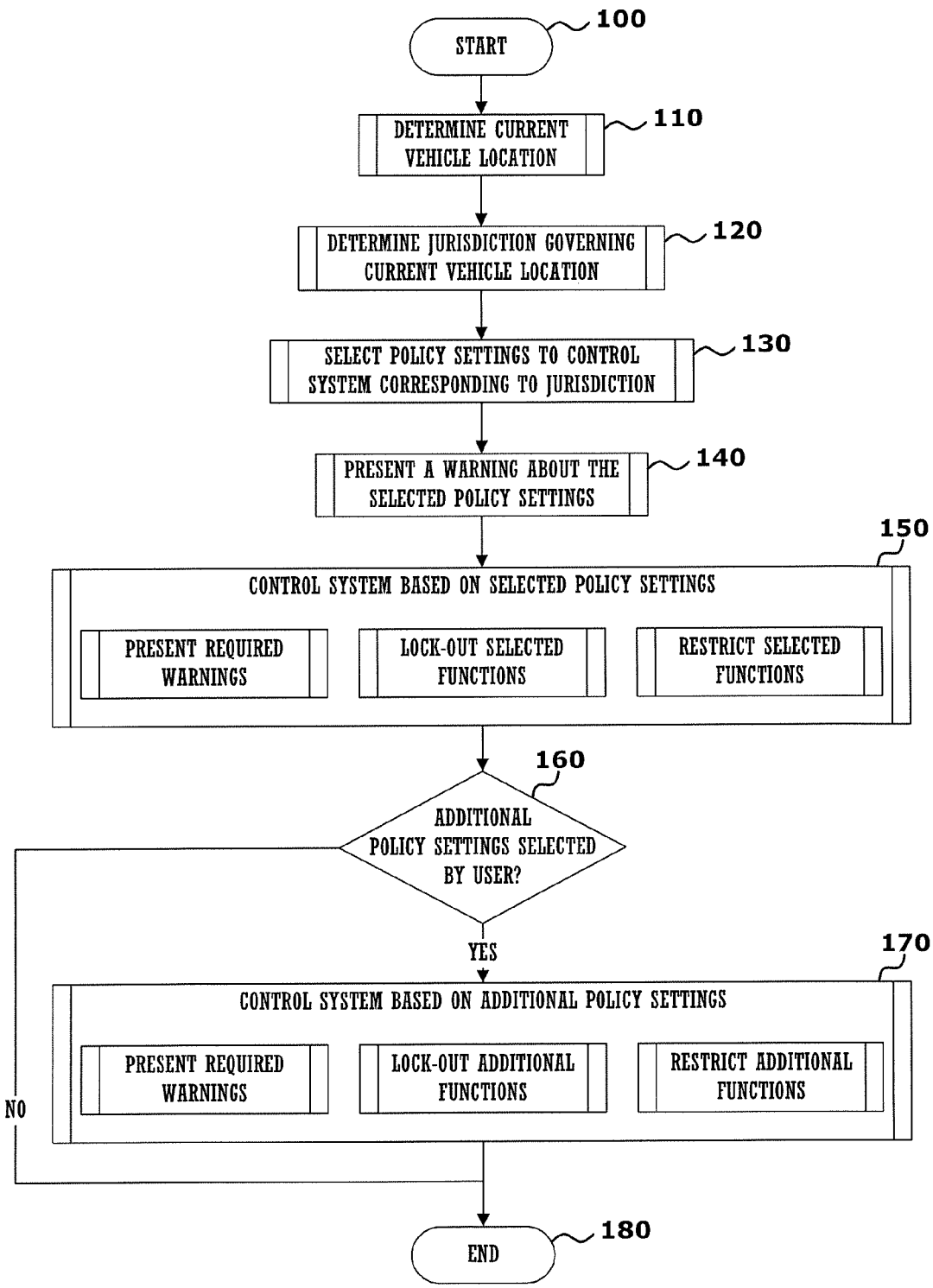
FIG. 3 is an exemplary flowchart illustrating operations of the vehicle user interface system for making available features of the user interface system based on a current jurisdiction of the vehicle.

If no additional policy settings have been selected, the processing shown in FIG. 3 then ends in step 180, and vehicle location determining component 24 continues to monitor the location of the vehicle. However, if additional policy settings have been selected, the controller 30 controls the system based on the additional policy settings in step 170 in a manner similar to that described above with regard to step 150. That is, the controller 30 can control the vehicle user interface system 12 to present the required warnings, such as those shown in FIG. 4 or 5. Also, the controller 30 can lock out or otherwise prevent the vehicle user interface system 12 from performing the system operations prohibited by the policy selection that was selected, and the controller 30 may restrict certain functions, instead of completely prohibiting them or locking them out.

The processing shown in FIG. 3 then ends in step 180. However, the vehicle location determining component 24 continues to monitor the location of the vehicle.

Figure 9:
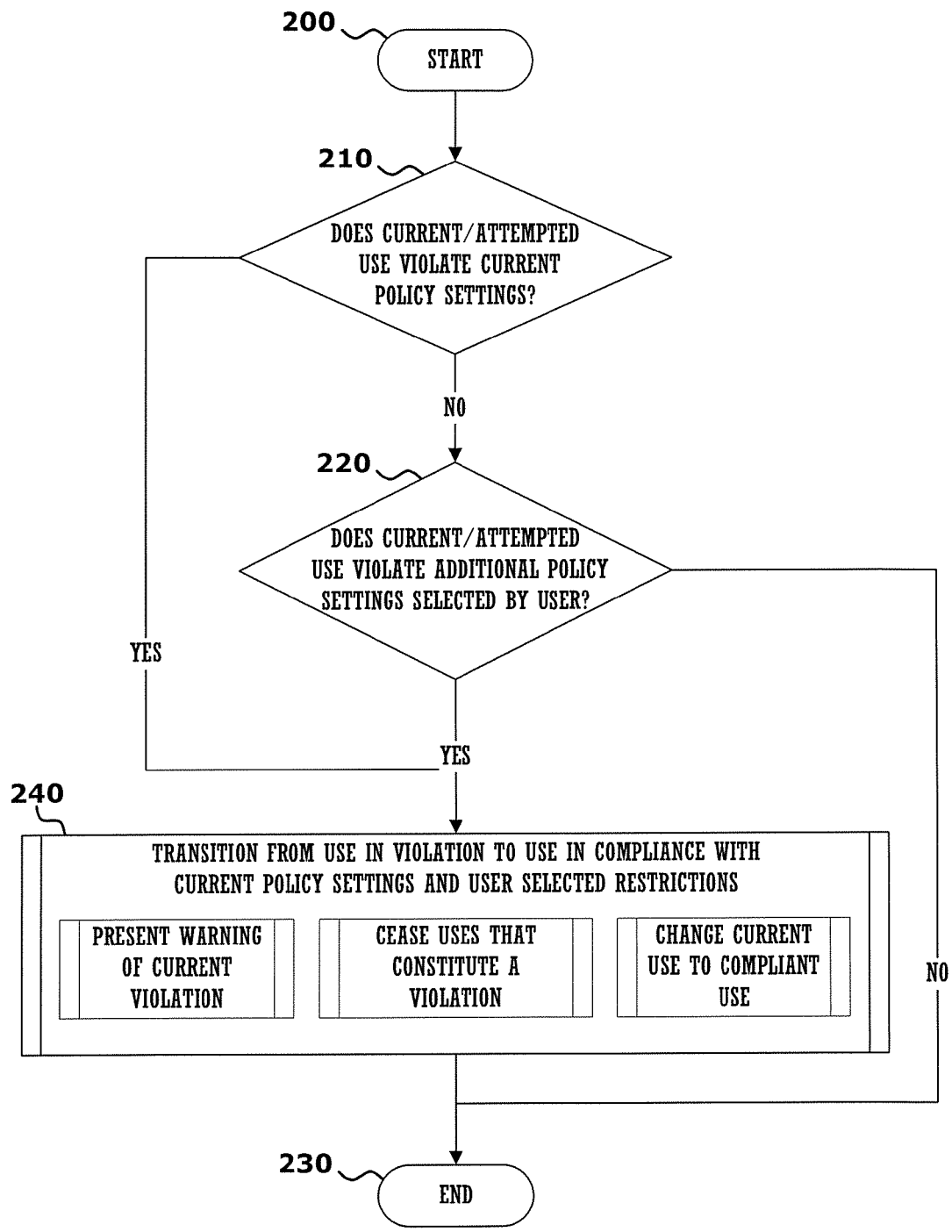
FIG. 9 is an exemplary flowchart illustrating operations of the vehicle user interface system for handling operations that may potentially be in violation of policy settings for the jurisdiction in which the vehicle is currently located.

As shown in the exemplary flowchart in FIG. 9, the vehicle user interface system 12 also monitors for when a user attempts to perform any operations of the vehicle user interface system that may potentially be in violation of policy settings for the jurisdiction in which the vehicle is currently located. For example, when the processing begins in step 200, the controller 30 determines in step 210 whether the current or attempted use violates current policy settings for that jurisdiction. At this time, the controller 30 can also determine the vehicle conditions (e.g., the speed of the vehicle, whether the vehicle is in park, etc.) and whether the user is a driver or passenger based on information from the vehicle speed sensor 44, vehicle transmission sensor 46 and occupant sensors 48.

If the controller 30 determines in step 210 that the current or attempted use does not violate current policy settings and/or are otherwise not restricted based on the vehicle conditions and user identification as a driver or passenger, the processing continues to step 220. In step 220, the controller 30 determines whether the current or attempted use violates additional policy settings that could be selected by the user, for example, or another entity (e.g., police) as discussed above with regard to step 160 in FIG. 3. The controller 30 can also determine the vehicle conditions (e.g., the speed of the vehicle, whether the vehicle is in park, etc.) and whether the user is a driver or passenger based on information from the vehicle speed sensor 44, vehicle transmission sensor 46 and occupant sensors 48.

If the controller 30 determines in step 220 that the current or attempted use does not violate additional policy settings and/or are otherwise not restricted based on the vehicle conditions and user identification as a driver or passenger, the processing ends in step 230. However, the vehicle location determining component 24 continues to monitor the location of the vehicle.

Alternatively, if a violation or potential violation is identified in steps 210 or 220, the processing continues to step 240 whether the vehicle user interface system 12 can transition to or permit alternate operations that are in compliance with the policy settings. For example, if the jurisdiction policy settings or additional user configured policy settings permit a driver to use a handset when the vehicle is in park, as long as the vehicle is in park, the driver is not in violation. However, once the vehicle is shifted into a motive gear, the driver is in violation. In this event, the controller 30 can control the display 14 to present a warning such as that shown in FIG. 4 or 5 as discussed above. The controller 30 can then disable the handset use and change to a compliant use, such as hands-free use. If the user attempts to use the handset, the controller 30 can control the display 14 to display a telephony display 60 with the use handset button 62 "grayed out" or disabled as shown in FIG. 6. The controller 30 can perform similar operations for other features of the vehicle user interface system 12 that are in violation or potentially in violation. The processing then ends in step 230, and the vehicle location determining component 24 continues to monitor the location of the vehicle.

Figure 10:
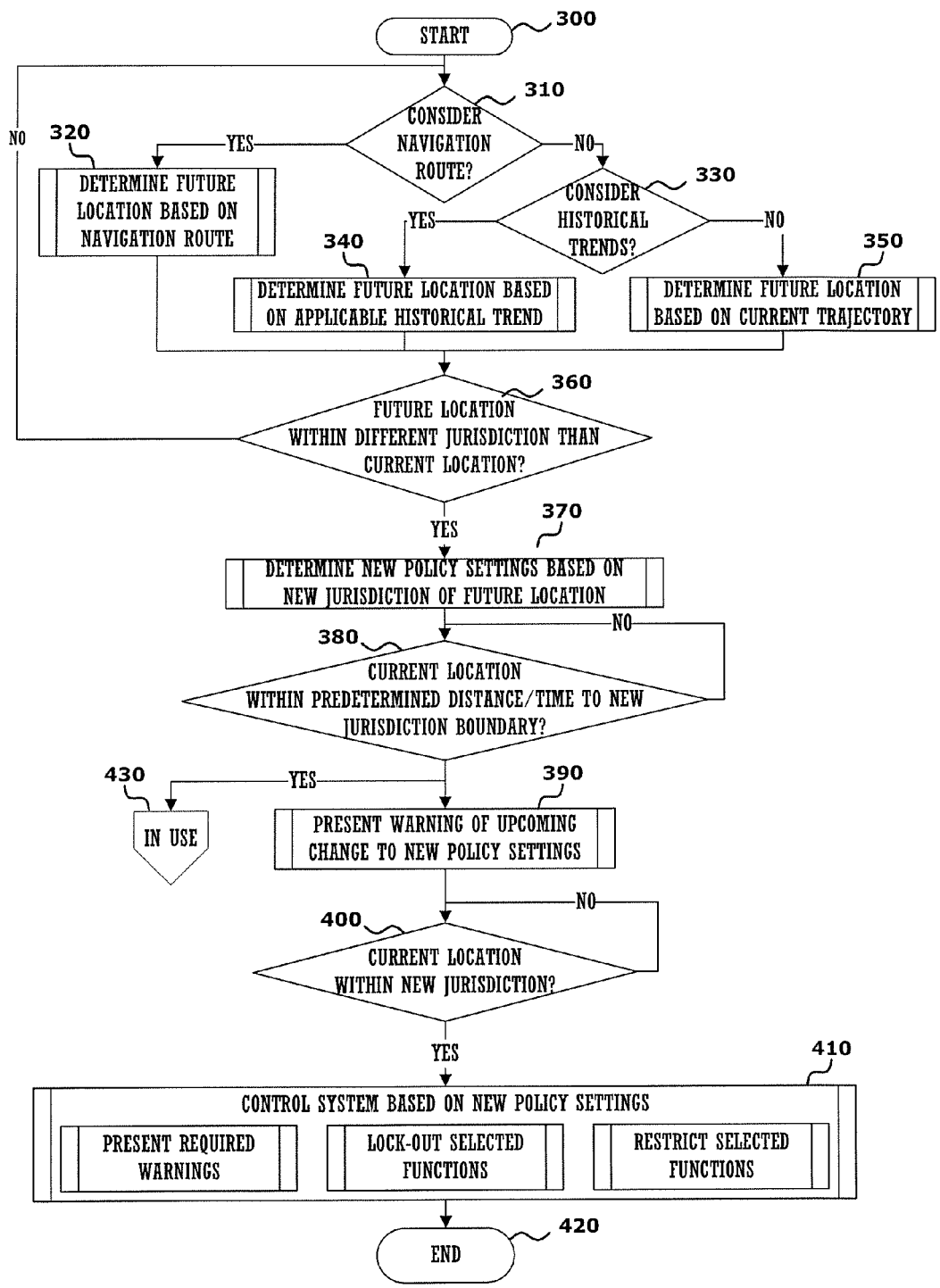
FIG. 10 is an exemplary flowchart illustrating operations of the vehicle user interface system for presenting a warning to a user regarding an upcoming new jurisdiction.

The vehicle user interface system 12 also operates to warn of a possible upcoming jurisdiction change. That is, as shown in FIG. 10, when the processing begins in step 300, the vehicle location determining component 24 determines in step 310 whether the user has entered trip destination information in the vehicle's navigation system. If trip destination information has been entered, the processing continues to step 320 where the vehicle location determining component 24 determines a potential future location of the vehicle based on the trip destination information that the user has set in the vehicle's navigation system.

However, if no destination or travel path information has been entered in the vehicle's navigation system, the processing continues to step 330 whether the vehicle location determining component 24 determines whether historical trends should be considered. For instance, many people living in one jurisdiction commute to and from another jurisdiction for their employment. Typically, a driver will travel the same or about the same route to and from their place of employment at or about the same time every day.

Hence, the controller 30 can control the vehicle user interface system 12 to store vehicle travel information, travel times, etc., and identify trends or patterns in vehicle travel. Accordingly, if historical trends should be considered, the processing continues to step 340 where the vehicle location determining component 24 determines the potential future location of the vehicle based on historical trends.

For example, if the vehicle location determining component 24 determines that the vehicle is traveling along the route the driver typically takes to work in a different jurisdiction every morning (e.g., from Virginia to Washington, D.C.), and the time is during the driver's usual morning commuting time (e.g., between 7 AM and 9 AM, Monday through Friday), the controller 30 can determine that the jurisdiction change is likely. On the contrary, if the vehicle location determining component 24 determines that the vehicle is traveling along a route that the driver usually takes to the shopping mall that is in the driver's home jurisdiction, the controller 30 may determine that the likelihood of the vehicle crossing into a new jurisdiction is low. Naturally, the vehicle user interface system 12 can be configured during a setup operation, for example, to avoid using historical trend data, or to give different weight to such historical trend data.

However, if the processing determines in step 330 that historical trends should not be considered because, for example, the vehicle is traveling on a route for which no significant historical trend data has been collected, the processing continues from step 330 to step 350 where the vehicle location determining component 24 determines a potential future location of the vehicle based on the trajectory of the vehicle as determined based on, for example, GPS or other location information indicating a path of travel of the vehicle.

After completing step 320, 340 or 350 as discussed above, the vehicle location determining component 24 can determine in step 360 whether the possibility exists that the vehicle may soon cross into another jurisdiction (e.g., cross state lines). If the future location is not within a different jurisdiction, the processing returns to step 310 and repeats as discussed above. However, if the vehicle location determining component 24 determines that a future location of the vehicle will be in a new jurisdiction, the processing continues to step 370.

Figure 11:
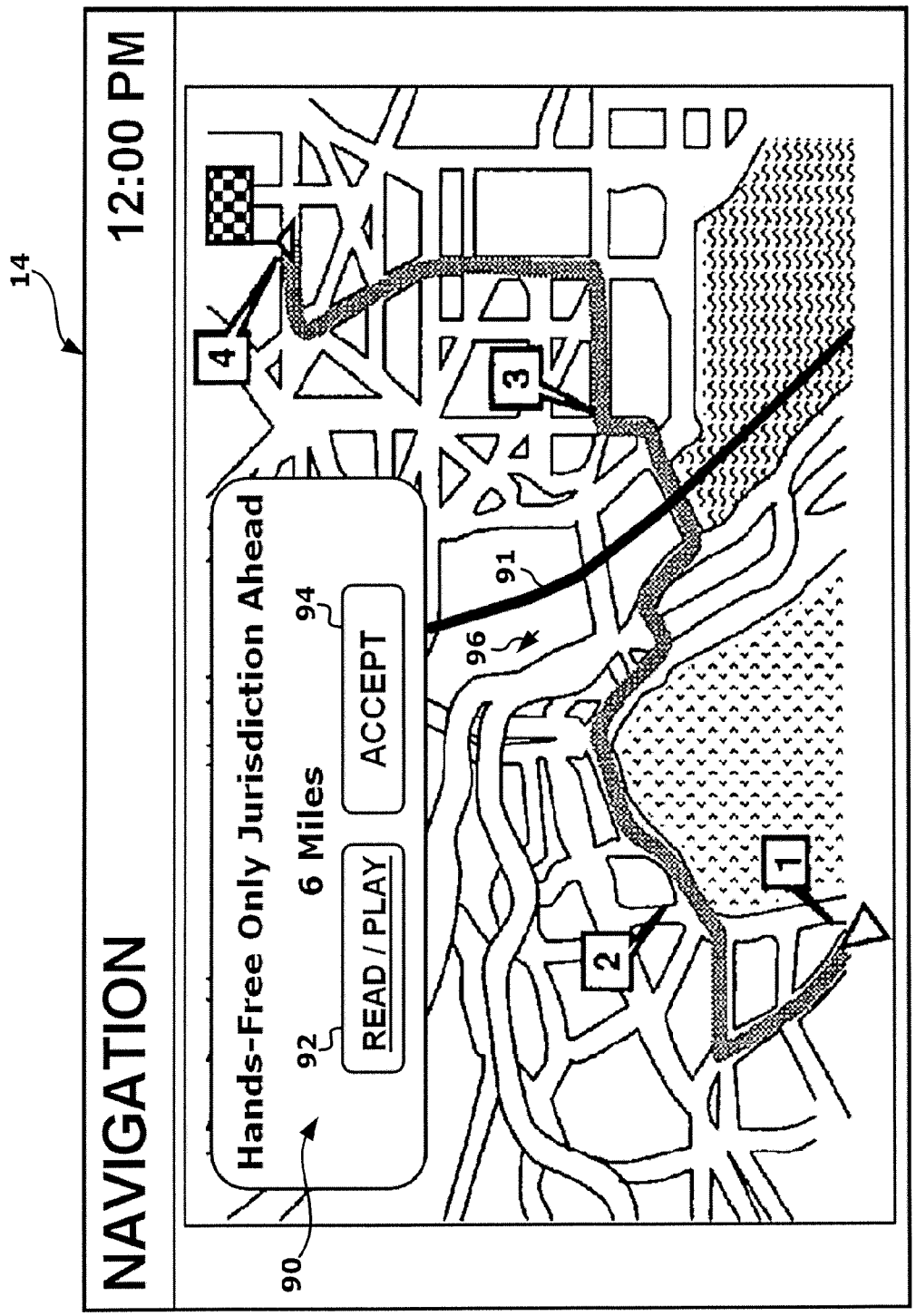
FIG. 11 is another example of a warning displayed by the vehicle user interface system.

In step 370, the jurisdiction determining component 26 determines the new policy settings for the new jurisdiction. That is, as discussed above, the jurisdiction determining component 26 can select the appropriate policy setting for the new jurisdiction. The jurisdiction determining component 26 can retrieve this information from, for example, a lookup table, or can request this information from server 40 or another location off the vehicle. In step 380, the controller 30, for example, then can determine whether the current vehicle location is within a predetermined distance or time of arrival to the new jurisdiction based on vehicle location information received from the vehicle location determining component 24. If the vehicle is not within the predetermined distance or time of arrival, the processing can repeat step 380. However, once the vehicle is within the predetermined distance or time of arrival, in step 390 the controller 30 can control the output component 32 to display a message screen 90 on the display screen 14 warning that the policy settings of the upcoming new jurisdiction prohibit certain operations (e.g., the use of a handset while driving) as shown, for example, in the display 90 of FIG. 11. As indicated, the jurisdictional boundary 91 (e.g., state lines) is displayed. In addition, or alternatively, the controller 30 can control the audio component 34 of the output component 32 to issue an audible warning about the prohibited operations. For example, the controller 30 can automatically control the audio component 34 to audibly read the text of the message. Also, the message can include a read/play button 92 that the user can select to instruct the controller 30 to control the audio component 34 to audibly read the text of the message. In addition, the message can include an acknowledgement button 94 that the user can select to acknowledge the warning. When the acknowledgement button has been selected, the controller 30 can control the display 14 to stop displaying the message.

The vehicle location determining component 24 continues to monitor the location of the vehicle, and the vehicle location determining component 24 or controller 30 determines in step 400 whether the vehicle has entered the new jurisdiction. That is, the controller 30 is further configured to control availability of the system operations for performance by the vehicle user interface system 12 based on the new selected policy setting when the vehicle is at a location relative to the new jurisdiction. This relative location can be a location at the point where the vehicle crosses into the new jurisdiction. (e.g., where the vehicle crosses the boundary 91).

Hence, when the vehicle has crossed into the new jurisdiction, the controller 30 can control the output component 32 in step 410 to issue a warning that new policy settings are now in effect. That is, the controller 30 can control the display 14 to display a warning, such as that shown in FIG. 4 or 5, and alternatively or in addition, the controller 30 can control the audio component 34 to issue an audible message that the vehicle is near or has crossed into the new jurisdiction and that the new policy settings are going into effect when the vehicle enters the new jurisdiction. By providing the warning of the change in jurisdiction, the user can be prepared to enter the jurisdiction without violating the laws of that jurisdiction. The controller 30 can also control the vehicle user interface system 12 to lock-out or prohibit certain operations, and to restrict certain operations, as discussed above with regard to step 150 as shown in FIG. 3.

The processing then ends in step 420. However, the vehicle location determining component 24 continues to monitor the location of the vehicle.

Figure 12:
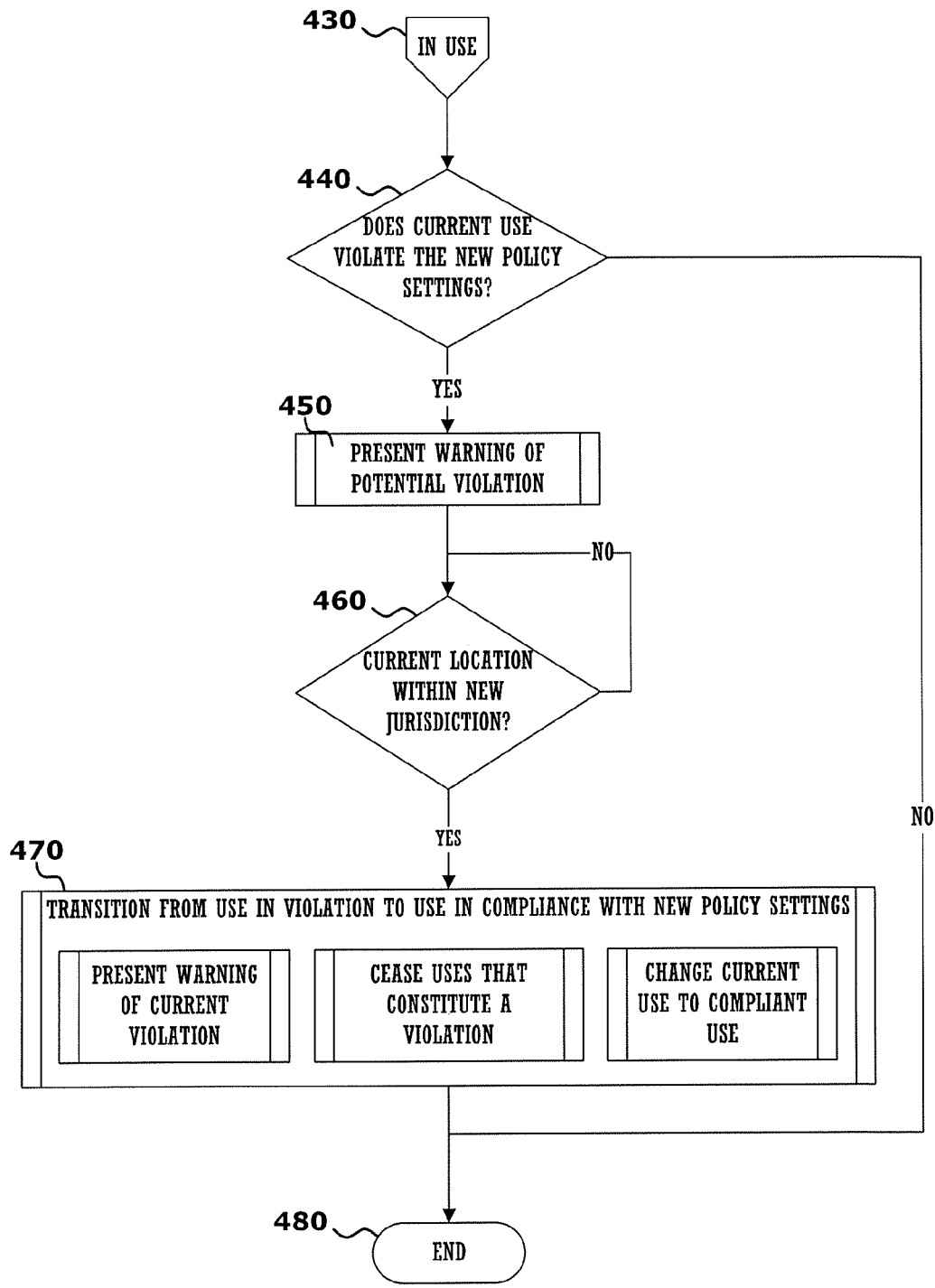
FIG. 12 is an exemplary flowchart illustrating operations of the vehicle user interface system for presenting a warning to a user that an operation currently being performed will be restricted based on a new jurisdiction.

In addition to the processing discussed above with regard to FIG. 10, if the user is using a feature of the vehicle user interface system 12, the processing beginning in step 430 is also performed, and can be performed concurrently with the processing beginning in step 390 as discussed above. That is, as shown in FIG. 12, the jurisdiction determining component 26, for example, can determine in step 440 whether the operation currently in use (e.g., handset use) violates the new policy settings associated with the new jurisdiction. If the current operation is not in violation of the new policy settings, this phase of the processing ends at step 480. However, the processing shown in FIG. 10 beginning at step 390 is still performed.

On the contrary, if it is determined in step 440 that the operation currently in use violates the new policy settings, the controller 30 controls the output component 32 to issue a visual and/or audible warning as discussed above and as shown, for example, in FIG. 11. The vehicle location determining component 24 continues to monitor the location of the vehicle, and the vehicle location determining component 24 or controller 30 determines in step 460 whether the vehicle has entered the new jurisdiction. Once the vehicle has entered the new jurisdiction, in step 470, the controller 30 controls the output component 32 to issue a visual and/or audible warning as shown, for example, in FIG. 5 as discussed above. Also, as discussed above with regard to step 240 shown in FIG. 9, the controller 30 also controls the vehicle user interface system 12 to discontinue use of any operations that are in violation of the new jurisdiction policy settings. Furthermore, the controller 30 can change the current use to a compliant use. For example, the controller 30 can control the vehicle user interface system 12 to switch from handset use to hands-free use during an ongoing telephone call, or to switch to a voice recognition system for texting messages, when the vehicle enters the new jurisdiction.

This phase of the processing then ends in step 480. However, the vehicle location determining component 24 continues to monitor the location of the vehicle as discussed above.

Figure 7:
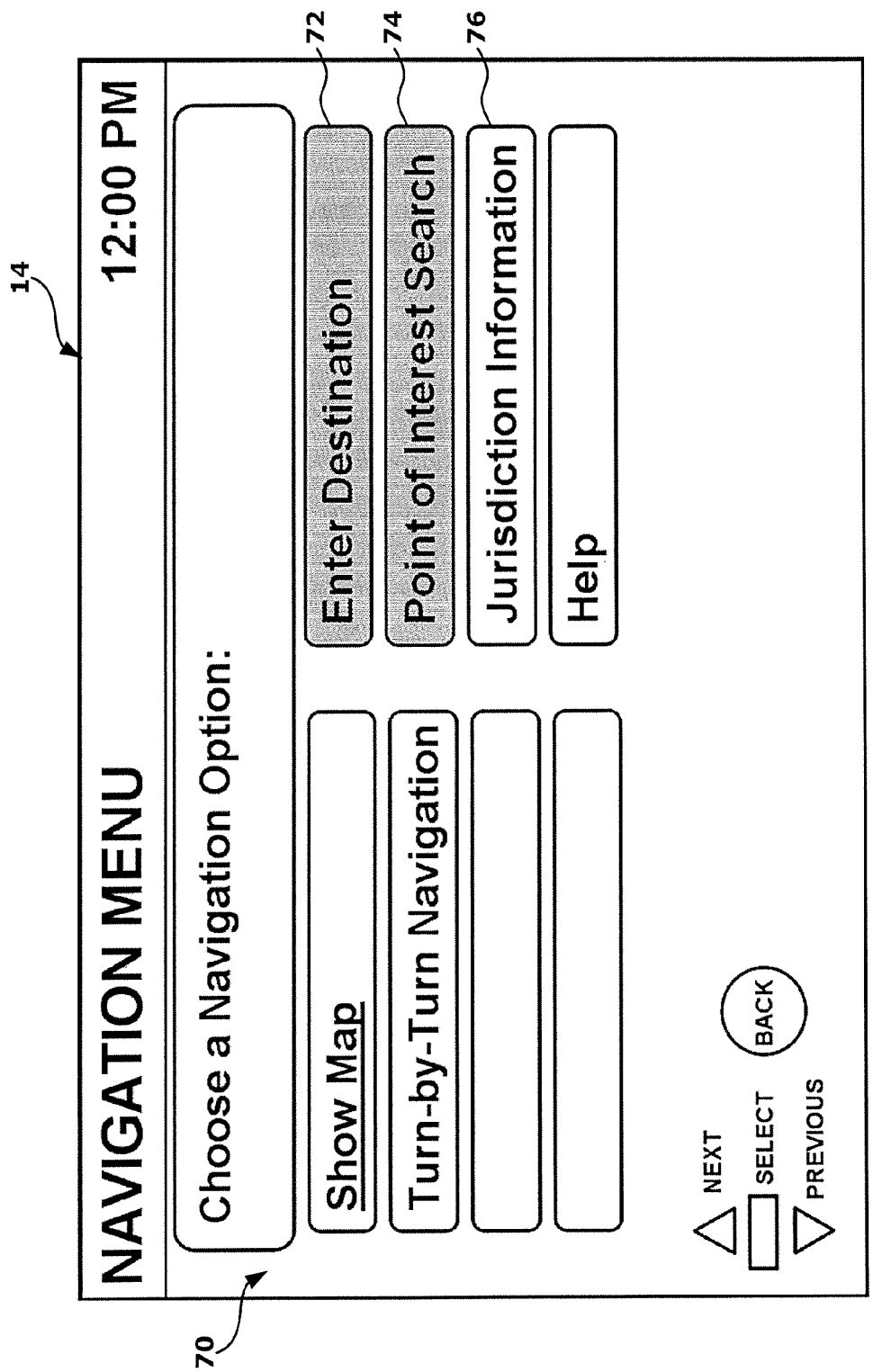
FIG. 7 is another example of a display screen having a function restricted or prohibited by the vehicle user interface system.

In addition, as discussed above with regard to FIG. 7, the controller 30 can control the vehicle user interface system 12 to enable a user to retrieve policy setting information associated with a particular jurisdiction. For example, the user can access such information via an access jurisdiction information button 76 as shown in FIG. 7 and discussed above. Also, the controller 30 can control the output component 32 to display an indicator 96 such as a pointer or cursor on the displayed map as shown, for example, in FIG. 11. The user can thus use, for example, the control buttons 16 and/or voice control to move the indicator 96 to point to a jurisdiction of interest. As the indicator 96 is moved over a jurisdiction, the controller 30 can, for example, control the output component 32 to display the policy settings associated with that jurisdiction in, for example, a pop up window on the display screen 90, or in any other suitable manner. Alternatively, or in addition, the controller 30 can control the output component 32 to present these policy settings audibly. Accordingly, as can be appreciated from the above, the vehicle user interface system 12 can be programmed to follow all types of jurisdictions, instead of using a single set of rules to govern navigational and communication systems. By providing a real-time means of updating policy settings and notification of potentially lawbreaking behavior, customer safety and satisfaction can be maximized throughout the life of the vehicle.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle user interface system comprising:
a vehicle location determining component configured to determine a current location of the vehicle and a future location of the vehicle;
a jurisdiction determining component configured to determine a current jurisdiction based on the current location of the vehicle, to select a current policy setting based on the current jurisdiction, to determine a new jurisdiction based on the future location, and to select a new policy setting based on the new jurisdiction;
a user input component configured to receive information used by the vehicle user interface system to perform system operations; and
a controller that is configured to control availability of the system operations for performance by the vehicle user interface system based on a selected policy setting, the selected policy setting being set to the current policy setting while the vehicle is within the current jurisdiction and the new policy setting while the vehicle is within the new jurisdiction, and is further configured to provide information pertaining to the new jurisdiction, including a warning of an upcoming change to the new jurisdiction prior to the vehicle entering the new jurisdiction,
the controller being further configured to refrain from including the warning in the information accessible to the user while all of the system operations currently being performed by the vehicle user interface system are permissible for performance by the vehicle user interface system under both the current policy setting and the new policy setting.

2. The vehicle user interface system according to claim 1, wherein
the controller is configured to limit performance of some of the system operations based on the selected policy setting.

3. The vehicle user interface system according to claim 1, further comprising
an output component configured to provide information pertaining to the system operations.

4. The vehicle user interface system according to claim 1, wherein
the controller is further configured to provide an alert based on the selected policy setting upon startup of the vehicle.

5. The vehicle user interface system according to claim 1, further comprising a navigation component configured to perform navigation operations which are among the system operations.

6. The vehicle user interface system according to claim 1, further comprising
a communication component configured to perform communication operations which are among the system operations.

7. The vehicle user interface system according to claim 1, wherein
the controller is further configured to determine the future location and the new jurisdiction based on a historical trend pertaining to the vehicle.

8. The vehicle user interface system according to claim 1, wherein
the controller is further configured to control availability of some of the system operations for performance by the vehicle user interface system based on the selected policy setting and a detected vehicle speed of the vehicle.

9. The vehicle user interface system according to claim 1, wherein
the controller is further configured to determine whether a user is a driver or a passenger, and to control availability of some of the system operations for performance by the vehicle user interface system based on the selected policy setting and whether the user is a driver or a passenger.

10. A method of controlling a user interface system of a vehicle, the method comprising
controlling availability of system operations for performance by the vehicle user interface system based on a selected policy setting;
determining a current location of the vehicle;
determining a current jurisdiction according to the current location;
selecting a current policy setting based on the current jurisdiction and setting the selected policy setting to the current policy setting while the vehicle is within the current jurisdiction;
determining a future location of the vehicle;
determining a new jurisdiction according to the future location;
selecting a new policy setting based on the new jurisdiction and setting the selected policy setting to the new policy setting while the vehicle is within the new jurisdiction;
providing information pertaining to the new jurisdiction, including a warning of an upcoming change to the new jurisdiction, prior to the vehicle entering the new jurisdiction; and
determining whether a current one of the system operations that is allowed under the current policy setting and is currently being performed by the user interface system would be limited according to the new policy setting, such that the providing of the information includes providing an indication that the current one of the system operations will be limited in the new jurisdiction.

11. The method according to claim 10, wherein
the determining of the future location of the vehicle is based on a historical trend pertaining to the vehicle.

12. The method according to claim 10, further comprising
selecting a second policy setting based on at least one of information provided by a user and a configuration of the vehicle.

13. The method according to claim 10, wherein
the controlling includes limiting availability of use of at least one feature of the system operations by the user interface system.

14. The method according to claim 10, wherein
the controlling includes limiting availability of use of at least one feature of the system operations by the user interface system based on the selected policy setting and a detected vehicle speed.

15. The method according to claim 10, further comprising
determining whether a user is a driver or a passenger of the vehicle; and
wherein the controlling includes limiting availability of use of at least one feature of the system operations by the user interface system based on the selected policy setting and whether the user is a driver or a passenger.

16. The method according to claim 10, wherein
the providing of the information pertaining to the new jurisdiction includes refraining from including the warning in the information accessible to the user while all of the system operations currently being performed by the vehicle user interface system are permissible for performance by the vehicle user interface system under both the current policy setting and the new policy setting.

17. A method of controlling a user interface system of a vehicle, the method comprising
determining a current location of the vehicle;
determining a current jurisdiction according to the current location;
selecting a current policy setting based on the current jurisdiction;
determining a historical trend pertaining to the vehicle;
determining a future location of the vehicle based on the historical trend;
determining a new jurisdiction based on the future location;
setting a selected policy setting as the current policy setting while the vehicle is within the current jurisdiction;
controlling availability of system operations for performance by the vehicle user interface system based on the selected policy setting;
providing information accessible to a user of the user interface system based on the new jurisdiction prior to the vehicle entering the new jurisdiction, the information including a warning of a possible change to the new jurisdiction;
selecting a new policy setting based on the new jurisdiction;
setting the selected policy setting to the new policy setting while the vehicle is within the new jurisdiction; and
controlling availability of the system operations for performance by the vehicle user interface system based on the selected policy setting while the vehicle is at a location within the new jurisdiction.

18. The method according to claim 17, further comprising
refraining from including the warning in the information accessible to the user while all of the system operations currently being performed by the vehicle user interface system are permissible for performance by the vehicle user interface system under both the current policy setting and the new policy setting.

* * * * *